United States Patent
Ozoe

(10) Patent No.: US 9,693,174 B2
(45) Date of Patent: Jun. 27, 2017

(54) WIRELESS DEVICE, WIRELESS COMMUNICATION SYSTEM, WIRELESS MODULE, INTERFACE MODULE, AND COMMUNICATION METHOD

(71) Applicant: Yokogawa Electric Corporation, Musashino-shi, Tokyo (JP)

(72) Inventor: Nobumichi Ozoe, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 15/030,164

(22) PCT Filed: Oct. 21, 2014

(86) PCT No.: PCT/JP2014/077920
§ 371 (c)(1),
(2) Date: Apr. 18, 2016

(87) PCT Pub. No.: WO2015/060291
PCT Pub. Date: Apr. 30, 2015

(65) Prior Publication Data
US 2016/0261972 A1 Sep. 8, 2016

(30) Foreign Application Priority Data

Oct. 24, 2013 (JP) ................................. 2013-221442

(51) Int. Cl.
*H04W 4/00* (2009.01)
*G05B 19/042* (2006.01)
(Continued)

(52) U.S. Cl.
CPC .......... *H04W 4/005* (2013.01); *G05B 19/042* (2013.01); *H04B 1/38* (2013.01); *H04L 67/12* (2013.01);
(Continued)

(58) Field of Classification Search
CPC ..................................................... H04W 4/005
See application file for complete search history.

(56) References Cited

U.S. PATENT DOCUMENTS

| 5,557,634 A | 9/1996 | Balasubramanian et al. |
| 7,460,865 B2 * | 12/2008 | Nixon ................. H04W 76/023 370/254 |

(Continued)

FOREIGN PATENT DOCUMENTS

| JP | 8-195785 A | 7/1996 |
| JP | 2000-83287 A | 3/2000 |

(Continued)

OTHER PUBLICATIONS

International Search Report of PCT/JP2014/077920 dated Nov. 18, 2014.

*Primary Examiner* — Tuan H Nguyen
(74) *Attorney, Agent, or Firm* — Sughrue Mion, PLLC

(57) ABSTRACT

A wireless device includes a wireless module and an interface module. One of the wireless module and the interface module generates a first message having a predetermined format and including data, which is to be transmitted to other one of the wireless module and the interface module, and type information representing a type of the data, and transmits the first message to the other one of the wireless module and the interface module. The other one of the wireless module and the interface module generates, in accordance with the type information included in the first message, a second message having the same format as the first message and including data, which is to be replied to the one of the wireless module and the interface module, and type information representing a type of the data, and replies the second message to the one of the wireless module and the interface module.

28 Claims, 11 Drawing Sheets

(51) Int. Cl.
*H04B 1/38* (2015.01)
*H04L 29/08* (2006.01)
(52) U.S. Cl.
CPC ............ *G05B 2219/25187* (2013.01); *G05B 2219/25428* (2013.01); *H04W 4/008* (2013.01)

(56) References Cited

U.S. PATENT DOCUMENTS

| | | | |
|---|---|---|---|
| 8,339,091 B2* | 12/2012 | Kamiya | B25J 9/16 318/568.2 |
| 2004/0259533 A1 | 12/2004 | Nixon et al. | |
| 2008/0211664 A1 | 9/2008 | Griech et al. | |
| 2009/0021391 A1 | 1/2009 | Kamiya | |

FOREIGN PATENT DOCUMENTS

| | | |
|---|---|---|
| JP | 2000-295165 A | 10/2000 |
| JP | 2004-252619 A | 9/2004 |
| JP | 2005-51746 A | 2/2005 |
| JP | 2009-25879 A | 2/2009 |

* cited by examiner

FIG. 4

| MESSAGE TYPE | TRANSMISSION SOURCE | TRANSMISSION DESTINATION |
|---|---|---|
| FIELD DEVICE CONTROL REQUEST | WIRELESS COMMUNICATOR 33 | SENSOR I/F 21 |
| FIELD DEVICE CONTROL RESPONSE | SENSOR I/F 21 | WIRELESS COMMUNICATOR 33 |
| SETTING REQUEST | SETTER 26 | WIRELESS COMMUNICATOR 33 |
| SETTING RESPONSE | WIRELESS COMMUNICATOR 33 | SETTER 26 |
| FIRMWARE IDENTIFIER OBTAINING REQUEST | WIRELESS COMMUNICATOR 33 | DIAGNOSER 24 |
| FIRMWARE IDENTIFIER OBTAINING RESPONSE | DIAGNOSER 24 | WIRELESS COMMUNICATOR 33 |
| STORAGE READ/WRITE REQUEST | WIRELESS COMMUNICATOR 33 | STORAGE 28 |
| STORAGE READ/WRITE RESPONSE | STORAGE 28 | WIRELESS COMMUNICATOR 33 |
| SENSOR I/F FIRMWARE UPDATING REQUEST | WIRELESS COMMUNICATOR 33 | COMMUNICATOR 23 |
| SENSOR I/F FIRMWARE UPDATING RESPONSE | COMMUNICATOR 23 | WIRELESS COMMUNICATOR 33 |

FIG. 5

| MESSAGE TYPE | TRANSMISSION SOURCE | TRANSMISSION DESTINATION |
|---|---|---|
| INITIALIZATION COMPLETION NOTICE OF WIRELESS MODULE | COMMUNICATOR 31 | COMMUNICATOR 23 |
| STOP PREPARATION COMPLETION NOTICE OF WIRELESS MODULE | COMMUNICATOR 31 | COMMUNICATOR 23 |
| POWER ON/OFF NOTICE OF FIELD DEVICE | WIRELESS COMMUNICATOR 33 | SENSOR I/F 21 |
| SUPPLIED POWER SETTING NOTICE OF FIELD DEVICE | WIRELESS COMMUNICATOR 33 | SENSOR I/F 21 |
| RESET NOTICE OF SENSOR I/F | WIRELESS COMMUNICATOR 33 | SENSOR I/F 21 |
| RESET NOTICE OF BATTERY REMAINING QUANTITY INFORMATION | WIRELESS COMMUNICATOR 33 | DIAGNOSER 24 |
| NOTICE OF BATTERY CONSUMPTION QUANTITY | WIRELESS COMMUNICATOR 33 | DIAGNOSER 24 |
| WIRELESS STATE DISPLAY NOTICE | WIRELESS COMMUNICATOR 33 | DISPLAY 25 |
| DISPLAY COMMON SETTING CHANGING NOTICE | WIRELESS COMMUNICATOR 33 | DISPLAY 25 |
| PROCESS VALUE DISPLAYING SETTING NOTICE | WIRELESS COMMUNICATOR 33 | DISPLAY 25 |
| ALERT DISPLAY NOTICE | WIRELESS COMMUNICATOR 33 | DISPLAY 25 |
| PROCESS VALUE DISPLAY NOTICE | WIRELESS COMMUNICATOR 33 | DISPLAY 25 |
| DEVICE SEARCH STATE DISPLAY NOTICE | WIRELESS COMMUNICATOR 33 | DISPLAY 25 |
| TEST STATE DISPLAY NOTICE | WIRELESS COMMUNICATOR 33 | DISPLAY 25 |
| WRITE PROHIBITION STATE DISPLAY NOTICE | WIRELESS COMMUNICATOR 33 | DISPLAY 25 |
| WIRELESS MODULE STATE NOTICE | DIAGNOSER 34 | DIAGNOSER 24 |

FIG. 6

| MESSAGE TYPE | TRANSMISSION SOURCE | TRANSMISSION DESTINATION |
|---|---|---|
| DIAGNOSIS INFORMATION NOTICE | DIAGNOSER 24 | WIRELESS COMMUNICATOR 33 |
| BATTERY REMAINING QUANTITY NOTICE | DIAGNOSER 24 | WIRELESS COMMUNICATOR 33 |
| FACTORY SHIPMENT STATE NOTICE | DISPLAY 25 | WIRELESS COMMUNICATOR 33 |
| DIP SWITCH STATE CHANGING NOTICE | DISPLAY 25 | WIRELESS COMMUNICATOR 33 |
| ALL DISPLAY STATE NOTICE | DISPLAY 25 | WIRELESS COMMUNICATOR 33 |

WIRELESS DEVICE, WIRELESS COMMUNICATION SYSTEM, WIRELESS MODULE, INTERFACE MODULE, AND COMMUNICATION METHOD

CROSS REFERENCE TO RELATED APPLICATIONS

This application is a National Stage of International Application No. PCT/JP2014/077920 filed Oct. 21, 2014, claiming priority based on Japanese Patent Application No. 2013-221442 filed Oct. 24, 2013, the contents of all of which are incorporated herein by reference in their entirety.

TECHNICAL FIELD

The present invention relates to a wireless device, a wireless communication system, a wireless module, an interface module, and a communication method.

BACKGROUND ART

Conventionally, in a plant and a factory, a distributed control system (DCS) is established in order to implement advanced automatic operations. Field devices (a measurement device and an operation device) and controller controlling them are connected to each other in the distributed control system. The field device included in the distributed control system performs wire communications. However, in recent years, a wireless field device which performs wireless communications in conformity with industrial wireless communication standards, such as ISA100.11a and WirelessHART (registered trademark), is realized.

An input/output part, a wireless communicator, and a controller are disposed in a case of the above-described wireless field device. The input/output part generally performs measurement or operation of state quantity (for example, pressure, temperature, and flow quantity) in an industrial process. The wireless communicator performs wireless communications in conformity with the above-described industrial wireless communication standards. The controller totally controls operation of the wireless field device, are disposed in a case of the above-described wireless field device. Moreover, the each part of the wireless field device is operated by electric power supplied from a single power source. Here, it is not necessary to connect the wireless field device to a communication line or a communication bus, like a conventional field device, and the wireless field device is basically installed in a plant independently. For the reason, the wireless field device is equipped with a battery as the single power source.

The following patent document 1 discloses that a wireless device is attached to the conventional field device which does not have a wireless communicator, and the wireless device is capable of operating the conventional field device as a wireless field device. Specifically, the wireless device disclosed in the following patent document 1 includes an interface, a wireless communicator, and a power source. The interface is connected to the conventional field device. The wireless communicator performs wireless communications. The power source supplies electric power to the conventional field device through the interface. In a case that a signal from the field device is input to the wireless device through the interface, the wireless device transmits the signal from the wireless communicator to a transmission destination (for example, a host controller). In a case that the wireless communicator receives a signal of which destination is the field device, the wireless device outputs the received signal to the field device through the interface.

CITATION LIST

Patent Literature

[Patent document 1] U.S. Patent Application Publication No. 2008/0211664

SUMMARY OF INVENTION

Technical Problem

By the way, the wireless device disclosed in the patent document 1 is installed near the field device. This is in order to omit a work of installing a pipeline (conduit) for protecting a connection line connecting the wireless device and the field device, and to suppress costs. However, since many pipelines and production facilities are installed, most of the field device is installed under an environment in which electric waves are easy to be reflected and blocked. For this reason, like the wireless device disclosed in the patent document 1, if the interface and the wireless communicator are integrated, there is a possibility that it is difficult to perform stable wireless communications.

In recent years, in order to realize stable wireless communications, a wireless device in which an interface and a wireless communicator are separated is being developed. Specifically, the wireless device includes two divided modules of an interface module equipped with the interface, and a wireless module equipped with the wireless communicator. The two modules are connected by a communication cable. The wireless device of such configuration can separate the wireless module from the interface module connected to the field device, and a flexibility of an installation position of the wireless module can be improved. For this reason, if the wireless module is installed in a place where a radio wave state is good, stable wireless communications can be performed.

Here, in the above-described wireless device disclosed in the patent document 1, the interface and the wireless communicator are integrated and manufactured by one manufacturer. For this reason, although a control protocol used for controlling the field device (a control protocol used between the interface and the field device) is based on a specification of the field device, a control protocol used for internal control (for example, a control protocol used between the interface and the wireless communicator) is used as a protocol of a custom specification.

However, each of the two modules of the wireless device may be separately manufactured by a different manufacturer. For this reason, like the wireless device disclosed in the patent document 1, if the control protocol used for internal control (a control protocol used between the modules) is a protocol of a custom specification, it is difficult to design and develop the modules. Since it is difficult, a design error may arise. If the design error arises during the device is operated actually, there is a possibility that the field device cannot be operated as the wireless field device which performs stable wireless communications.

Solution to Problem

In order to solve the above problems, a wireless device includes a wireless module configured to wirelessly transmit a signal which has been received from a field device, and wirelessly receive a signal which is to be transmitted to the field device, and an interface module which is disposed between the wireless module and the field device, wherein one of the wireless module and the interface module generates a first message having a predetermined format, the first message includes data and type information, the data is to be transmitted to other one of the wireless module and the interface module, the type information represents a type of the data, and the one of the wireless module and the interface module transmits the first message to the other one of the wireless module and the interface module, and wherein the other one of the wireless module and the interface module generates a second message having the same format as the first message in accordance with the type information included in the first message, the second message includes data and type information, the data is to be replied to the one of the wireless module and the interface module, the type information represents a type of the data, and the other one of the wireless module and the interface module replies the second message to the one of the wireless module and the interface module.

Moreover, in the wireless device of the present invention, in a case that the type information included in the first message is a processing request, the other one of the wireless module and the interface module may store the type information in the second message as a processing response.

Moreover, in the wireless device of the present invention, in a case that the type information included in the first message is a processing request to a self-module, the other one of the wireless module and the interface module may store a processing result of processing performed according to the processing request in the second message as data which is to be replied.

Moreover, in the wireless device of the present invention, the processing request, as the type information included in the first message which is transmitted from the wireless module to the interface module, may include a control request to the field device, and the processing response, as the type information included in the second message which is replied from the interface module to the wireless module, may include a control response from the field device.

Moreover, in the wireless device of the present invention, in a case that the type information included in the first message represents notifications or instructions, the other one of the wireless module and the interface module performs processing in accordance with the notifications or the instructions, and may not reply to the one of the wireless module and the interface module.

Moreover, in the wireless device of the present invention, the interface module comprises a display, the processing request, as the type information included in the first message which is transmitted from the wireless module to the interface module, may include a wireless state display notice for displaying information representing a wireless state of the wireless module on the display, and even if the interface module receives the first message about the wireless state display notice, the interface module does not reply the second message to the wireless module.

Moreover, in the wireless device of the present invention, the interface module comprises a power source, the processing request, as the type information included in the first message which is transmitted from the interface module to the wireless module, may include a battery remaining quantity notice for notifying a battery remaining quantity, and even if the wireless module receives the first message about the battery remaining quantity notice, the wireless module may not reply the second message to the interface module.

Moreover, in the wireless device of the present invention, the wireless module may further include a wireless communicator configured to wirelessly communicate, a first communicator configured to communicate with the interface module, and a first controller configured to control the wireless communicator and the first communicator.

Moreover, in the wireless device of the present invention, the first controller may generate data which includes information representing a transmission source and a transmission destination of the first message, the type information, information representing a size of data which is to be transmitted to the interface module, and data which is to be transmitted to the interface module.

Moreover, in the wireless device of the present invention, the first communicator may add information representing a start of the first message, information which is used for performing error check of transmission and reception, and information representing an end of the first message to the data generated by the first controller to generate the first message, and the first communicator may transmit the generated first message the interface module.

Moreover, in the wireless device of the present invention, the interface module may include a sensor I/F configured to communicate with the field device, a second communicator configured to communicate with the wireless module, and a second controller configured to control the sensor I/F and the second communicator.

Moreover, in the wireless device of the present invention, the second communicator may delete, from the first message received from the wireless module, the information representing a start of the first message and the information representing an end of the first message.

Moreover, in the wireless device of the present invention, the second communicator may determine whether an error exists or not based on the information which is used for performing the error check of transmission and reception, which is included in the first message received from the wireless module.

Moreover, in the wireless device of the present invention, in a case that the second communicator determines the error does not exist, the second controller may analyze the type information included in the first message, and may perform in accordance with a result of the analyze.

Moreover, in the wireless device of the present invention, the interface module may include a first interface module configured to communicate with a first field device and a second interface module configured to communicate with a second field device where a communication protocol, which is different from that of the first field device, is implemented, and the wireless module may include a first wireless module configured to communicate with the first interface module and a second wireless module configured to communicate with the second interface module.

Moreover, a wireless module of the present invention includes a communicator configured to wirelessly receive a first message which has been received from outside, and wirelessly transmit a second message to outside, and a controller configured to control the communicator to transmit the second message, the second message having a predetermined format, the second message including data and type information, the data is to be transmitted to outside, the type information representing a type of the data.

Moreover, in the wireless module of the present invention, the controller may reply the second message from the communicator to outside in accordance with the type information included in the first message, and the second message may be the same format as the first message, which includes data which is to be replied to outside and type information representing a type of the data.

Moreover, an interface module of the present invention includes a communicator configured to wirelessly receive a first message from a wireless module, and wirelessly transmit a second message to the wireless module, and a controller configured to control the communicator to reply the second message to the wireless module in accordance with type information included in the first message, the second message having the same format as the first message, the second message including data and type information, the data is to be replied to the wireless module, the type information representing a type of the data.

Moreover, in the interface module of the present invention, the controller may transmit a third message from the communicator to the wireless module, and the third message may be of a predetermined format which includes data which is to be transmitted to the wireless device and type information representing a type of the data.

Moreover, a communication method of the present invention includes generating, by one of the wireless module and the interface module, first message having a predetermined format, the first message including data and type information, the data being to be transmitted to other one of the wireless module and the interface module, the type information representing a type of the data, transmitting, by the one of the wireless module and the interface module, the first message to the other one of the wireless module and the interface module, generating, by the other one of the wireless module and the interface module, a second message having the same format as the first message in accordance with the type information included in the first message, the second message including data and type information, the data being to be replied to the one of the wireless module and the interface module, the type information representing a type of the data, and replying, by the other one of the wireless module and the interface module, the second message to the one of the wireless module and the interface module.

Advantageous Effects of Invention

According to the present invention, a wireless device, a wireless communication system, a wireless module, and an interface module, which are capable of being designed and developed easily and performing stable wireless communications, can be provided.

BRIEF DESCRIPTION OF DRAWINGS

FIG. 4 is a drawing illustrating an example of messages transmitted and received by the request/response type sequence in the embodiment of the present invention.

FIG. 5 is a drawing illustrating an example of messages transmitted by the first request type sequence in the embodiment of the present invention.

FIG. 6 is a drawing illustrating an example of messages transmitted by the second request type sequence in the embodiment of the present invention.

DESCRIPTION OF EMBODIMENTS

An aspect of some embodiments of the present invention is to provide a wireless device, a wireless communication system, a wireless module, an interface module, and a communication method which are capable of being designed and developed easily and performing stable wireless communications.

A wireless device, a wireless communication system, a wireless module, an interface module, and a communication method in embodiments of the present invention will be described in detail below with reference to drawings.

<Wireless System>

Figure 1:
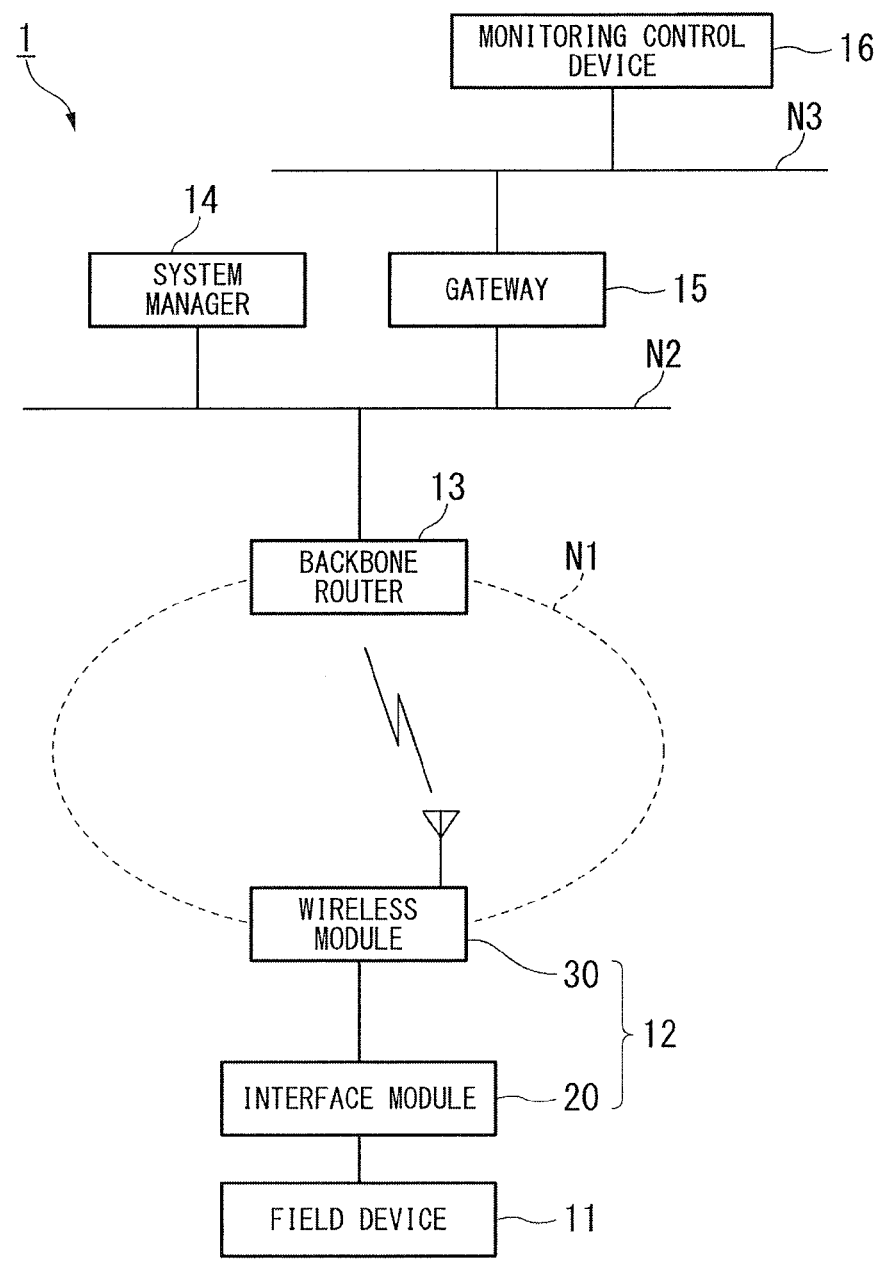
FIG. 1 is a block diagram illustrating a whole configuration of the wireless communication system in which the wireless device is used in the embodiment of the present invention.

FIG. 1 is a block diagram illustrating a whole configuration of the wireless communication system in which the wireless device is used in the embodiment of the present invention. As shown in FIG. 1, the wireless communication system 1 is equipped with a field device 11, a wireless device 12, a backbone router 13, a system manager 14, a gateway 15, and a monitoring control device 16. The wireless communication system 1 can perform wireless communications through a wireless network N1. For example, the wireless communication system 1 is established in a plant or a factory (hereinafter called simply "plant" as a generic name of them).

Here, the wireless network N1, the backbone network N2, and the control network N3 are established in the plant where the wireless communication system 1 is established. The wireless network N1 is realized by the wireless device 12 and the backbone router 13. The wireless device 12 is connected to the field device 11 installed at a field of the plant. The wireless network N1 is a network managed by the system manager 14. The number of the wireless device 12 and the backbone router 13, which are included in the wireless network N1, is arbitrary.

The backbone network N2 is a wired network used as a base of the wireless communication system 1. The backbone router 13, the system manager 14, and the gateway 15 are connected to the backbone network N2. The control network N3 is a wired network positioned higher than the backbone network N2. The gateway 15 and the monitoring control device 16 are connected to the control network N3.

The field device 11 is installed in a field of the plant. The field device 11 performs at least one of measurement and operation which are required for control of an industrial process under control of the monitoring control device 16, the field device 11 is such as a sensor device (for example, a flowmeter and a temperature sensor), a valve device (for example, a flow control valve and an on-off valve), an actuator device (for example, a fan and a motor), an imaging device (for example, a camera and a video camera recording circumstances and objects in the plant), a sound device (for example, a microphone collecting abnormal noise in the plant, and a speaker generating alarm sound), a position detection device outputting position information of each device, and other devices. In order to understand easily, the field device 11 will be described below as a sensor device which measures a flow quantity of fluid.

The wireless device 12 is equipped with an interface module 20 connected to the field device 11 and a wireless module 30 connected to the interface module 20. The wireless module 30 transmits and receives wireless signals through the wireless network N1. The wireless module 30 can perform wireless communications in conformity with ISA 100.11a. The wireless device 12 is connected to the field device 11 which does not have a wireless communication function. The wireless device 12 converts a signal from the field device 11 into a wireless signal, and transmits the wireless signal to the wireless network N1. Moreover, the wireless device 12 receives a wireless signal which is to be transmitted to the field device 11 through the wireless network N1. Details of the interface module 20 and the wireless module 30, which are included in the wireless device 12, will be described later.

The backbone router 13 connects the wireless network N1 and the backbone network N2. The backbone router 13 relays data transmitted and received between the wireless network N1 and the backbone network N2. The backbone router 13 can perform wireless communications in conformity with ISA 100.11a, like the wireless module 30 included in the wireless device 12.

The system manager 14 controls wireless communications performed through the wireless network N1. Specifically, an allocation control of communication resource (time slot and channel) with respect to the wireless module 30 included in the wireless device 12, the backbone router 13, and the gateway 15 is performed, so that wireless communications through the wireless network N1 can be realized. The system manager 14 also performs processing of allowing the wireless device 12 to join the wireless network N1.

The gateway 15 connects the backbone network N2 and the control network N3. The gateway 15 relays various types of data transmitted and received between the field device 11, the system manager 14, or the like, and the monitoring control device 16. By the gateway 15, the backbone network N2 and the control network N3 are mutually connectable while maintaining security.

For example, the monitoring control device 16 is operated by a plant operator. The monitoring control device 16 monitors and manages the field device 11. Specifically, the monitoring control device 16 collects measurement data (flow quantity value) from the field device 11 via the gateway 15 in order to monitor the field device 11. The monitoring control device 16 calculates a control amount (for example, degree of opening a valve) of another unillustrated field device based on the collected measurement data. The monitoring control device 16 controls the field device 11 by setting the calculated control amount of the field device to the other unillustrated field device via the gateway 15 in order to operate it.

<Wireless Device>

Figure 2:
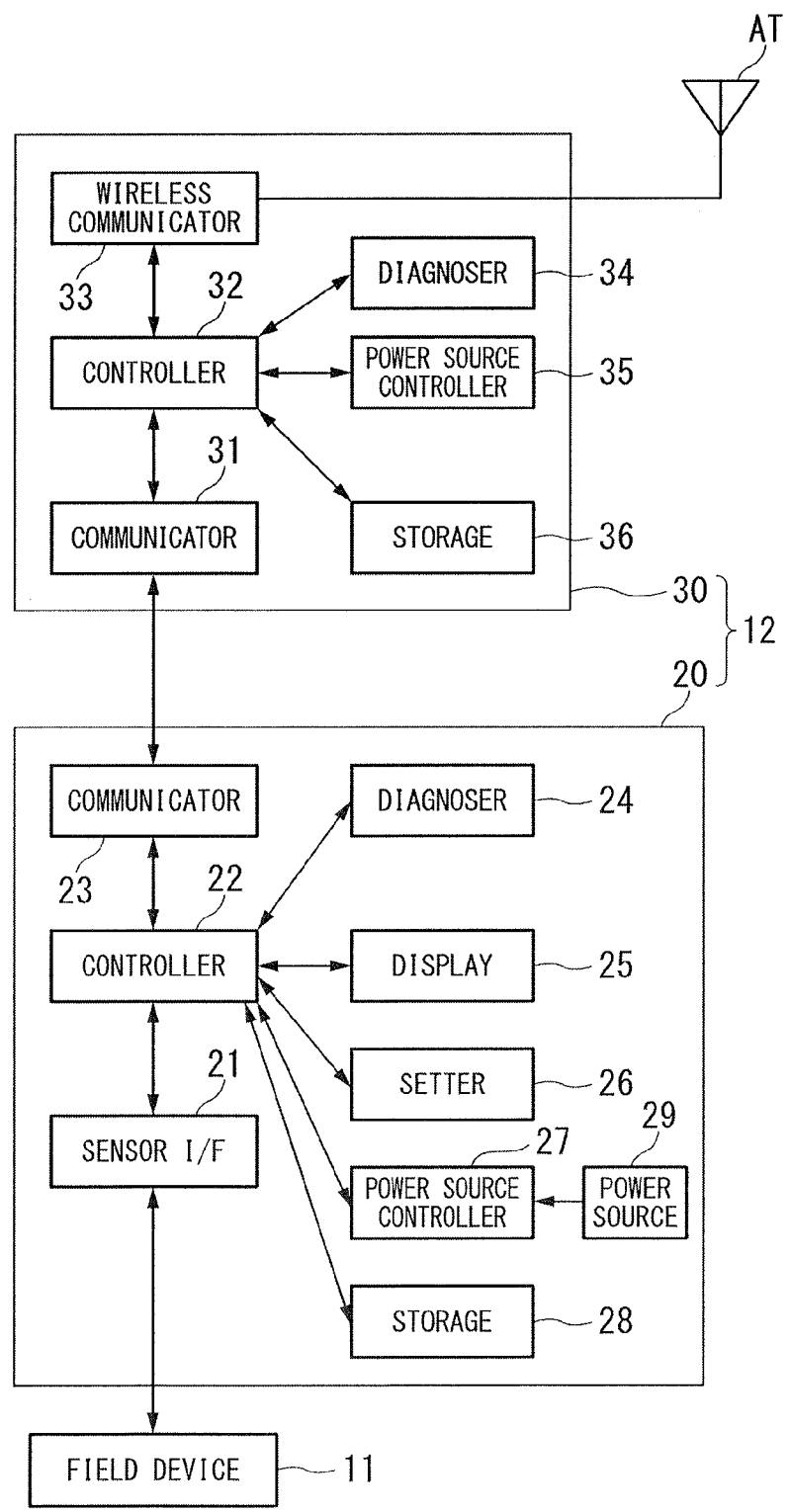
FIG. 2 is a block diagram illustrating a main part of the wireless device in the embodiment of the present invention.

FIG. 2 is a block diagram illustrating a main part of the wireless device in the embodiment of the present invention. Hereinafter, internal configurations of the interface module 20 and the wireless module 30 included in the wireless device 12 will be described in order, with reference to FIG. 2. The interface module 20 is equipped with a sensor I/F (interface) 21, a controller 22, a communicator 23, a diagnoser 24, a display 25, a setter 26, a power source controller 27, a storage 28, and a power source 29. The interface module 20 of the configuration is disposed between the wireless module 30 and the field device 11. The interface module 20 is an interface for connecting the wireless module 30 and the field device 11.

The sensor I/F 21 is connected to the field device 11. The sensor I/F 21 receives signals from the field device 11 under control of the controller 22. Moreover, the sensor I/F 21 transmits signals toward the field device 11 under control of the controller 22. That is, the same communication protocol as the field device 11 is implemented in the sensor I/F 21 in order to communicate with the field device 11.

The controller 22 totally controls operation of the interface module 20. For example, the controller 22 controls the sensor I/F 21 based on a control signal (control signal from the monitoring control device 16) included in a message transmitted from the wireless module 30 in order to obtain the measurement data (flow quantity value) measured by the field device 11. The controller 22 also controls the communicator 23 to transmit messages to the wireless module 30 and receive messages from the wireless module 30. For example, the controller 22 controls to transmit the measurement data obtained by the sensor I/F 21 to the wireless module 30. Although details will be described later, the message transmitted and received between the interface module 20 and the wireless module 30 is a message of a predetermined format.

The communicator 23 receives a message transmitted from the wireless module 30. Moreover, the communicator 23 transmits a message to the wireless module 30. Here, in a case that the communicator 23 receives a message from the wireless module 30, the communicator 23 performs predetermined message processing (reception message processing) to the received message. On the other hand, in a case that data which is to be transmitted to the wireless module 30 is output from the controller 22, the communicator 23 performs predetermined message processing (transmission message processing) to the data. Details of the reception message processing and the transmission message processing will be described later.

The diagnoser 24 has a self-diagnostic function, and diagnoses a state of the self-module (interface module 20) under control of the controller 22. For example, the diagnoser 24 diagnoses an existence of failure of the interface module 20, a connection state of the field device 11, a remaining quantity of the power source 29, and so on. For example, the display 25 is equipped with a display device, such as a liquid crystal display. The display 25 displays various types of information under control of the controller 22. For example, the display 25 displays measurement data (flow quantity value) obtained from the field device 11 and information which represents a state of the interface module 20 or the wireless module 30.

The setter 26 is equipped with an external interface (for example, infrared communicator) connected to an external device. The setter 26 sets information which is to be set to the wireless device 12 based on instructions from the external device. Here, for example, the external device is a provisioning device. The setter 26 sets provisioning information (information which is necessary to join the wireless network N1) transmitted from the provisioning device by infrared communication.

The power source controller 27 is equipped with a power source circuit (not shown) which converts the electric power from the power source 29 into electric power suitable for the field device 11, the interface module 20, and the wireless module 30. The power source controller 27 supplies electric power to the field device 11, each part of the interface module 20, and the wireless module 30 under control of the controller 22. In a case that the field device 11 incorporates a power source or receives electric power supplied from another route, the power source controller 27 does not supply electric power to the field device 11. The storage 28 stores identification information for identifying the interface module 20 and information which represents the remaining quantity of the power source 29. For example, the storage 28 is a nonvolatile memory, such as a flash ROM (Read Only Memory) and EEPROM (Electrically Erasable and Programmable ROM).

The power source 29 supplies electric power as an electric power source for operating the field device 11, the interface module 20, and the wireless module 30. Here, as the power source 29, a battery (for example, a primary battery or a secondary battery of which self-discharge is very little, such as a thionyl chloride lithium battery), a fuel cell, a capacitor, or a power generation circuit which performs environmental power generation (so called, energy harvest such as a solar cell) can be used.

The wireless module 30 is equipped with a communicator 31, a controller 32, a wireless communicator 33, a diagnoser 34, a power source controller 35, a storage 36, and an antenna AT. The wireless module 30 of the configuration is connected to the interface module 20. The wireless module 30 transmits and receives wireless signals through the wireless network N1.

The communicator 31 receives a message transmitted from the interface module 20. Moreover, the communicator 31 transmits a message to the interface module 20. Here, the communicator 31 performs the same processing as the communicator 23 of the interface module 20. That is, in a case that the communicator 31 receives a message from the interface module 20, the communicator 31 performs predetermined reception message processing (details will be described later) to the received message. On the other hand, in a case that data which is to be transmitted to the interface module 20 is output from the controller 32, the communicator 31 performs predetermined transmission message processing (details will be described later) to the data.

The controller 32 totally controls operation of the wireless module 30. For example, the controller 32 controls each part of the wireless module 30 based on data (for example, control data for controlling the wireless module 30) included in a message from the interface module 20. The controller 32 controls the communicator 31 to transmit a message to the interface module 20 and receive a message from the interface module 20.

The wireless communicator 33 transmits wireless signals to the wireless network N1 through the antenna AT under control of the controller 32. Moreover, the wireless communicator 33 receives wireless signals transmitted through the wireless network N1 and the antenna AT under control of the controller 32. The wireless communicator 33 performs wireless communications in conformity with ISA100.11a described above. In addition, the antenna AT may be an internal antenna stored in the wireless module 30, or may be an external antenna disposed outside the wireless module 30. The diagnoser 34 has a self-diagnostic function. The diagnoser 34 diagnoses a state of the self-module (wireless module 30) under control of the controller 32. For example, the diagnoser 34 diagnoses an existence of failure of the wireless module 30.

The power source controller 35 controls whether to supply electric power from the interface module 20 to each part of the wireless module 30 or not, under control of the controller 32. The power source controller 35 performs such control in order to suppress power consumption of the power source 29 disposed in the interface module 20. The storage 36 stores information set to the wireless module 30. The storage 36 is the same type nonvolatile memory as the storage 28 disposed in the interface module 20.

<Message Format>

Figure 3:
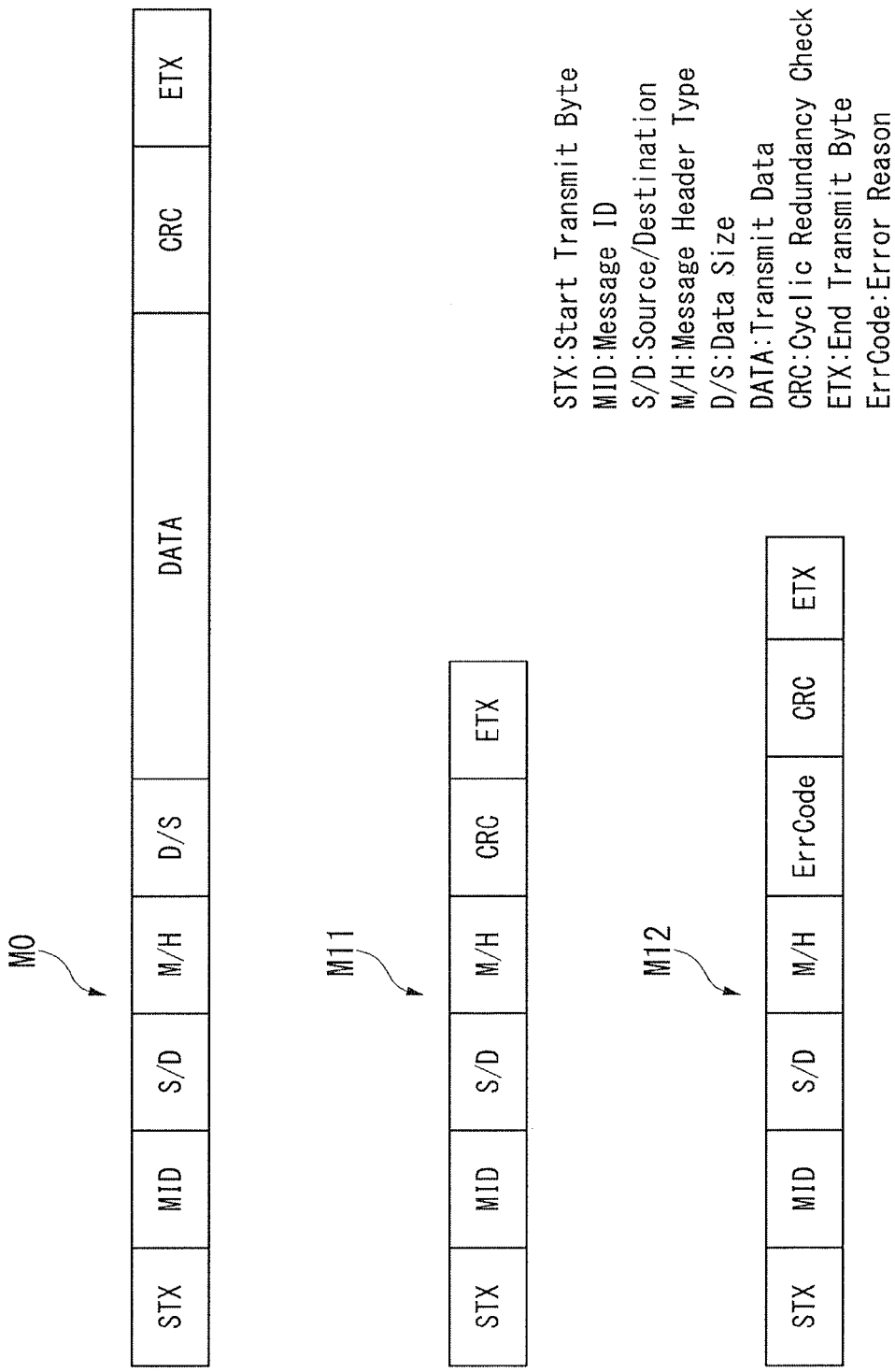
FIG. 3 is a drawing illustrating a format of messages transmitted and received by the wireless device in the embodiment of the present invention.

Next, a format of messages transmitted and received between the interface module 20 and the wireless module 30 which are included in the wireless device 12 is described. FIG. 3 is a drawing illustrating a format of messages transmitted and received by the wireless device in the embodiment of the present invention. Here, as shown in FIG. 3, messages transmitted and received between the interface module 20 and the wireless module 30 of the wireless device 12 include a data message M0, an ACK message M11, and a NACK message M12.

The data message M0 is a message for transmitting and receiving data between the interface module 20 and the wireless module 30. The data message M0 includes eight fields in which "STX", "MID", "S/D", "M/H", "D/S", "DATA", "CRC", and "ETX" are stored respectively. On the other hand, the ACK message M11 is a message for transmitting normal reception (acknowledgment) from a receiving side module to a transmitting side module. The ACK message M11 includes six fields in which two fields where "D/S" and "DATA" are stored are omitted from the data message M0. The NACK message M12 is a message for transmitting abnormal reception (negative response) from a receiving side module to a transmitting side module. The NACK message M12 includes seven fields in which a field where "ErrCode" is stored is added, instead of the fields where "D/S" and "DATA" of the data message M0 are stored.

In addition, meaning of "STX", "MID", "S/D", "M/H", "D/S", "DATA", "CRC", "ETX", and "ErrCode" shown in FIG. 3 is as follows.

"STX": Information which represents start of a message
"MID": Identifier given to each message (message ID)
"S/D": Information which represents a transmission source and a transmission destination of a message
"M/H": Information which represents a type of "DATA" or ACK/NACK (type information)
"D/S": Information which represents a size of "DATA"
"DATA": Data which is to be transmitted to another module
"CRC": Information used for error checking of transmission and reception (Cyclic Redundancy Check)
"ETX": Information which represents end of a message
"ErrCode": Error code At a time of transmitting a message, the three fields (fields where "STX", "MID", and "S/D" are stored) of the head of the data message M0, the ACK message M11, and the NACK message M12 and the two fields (field where "CRC" and "ETX" are stored) of the end thereof are added in the transmission message processing performed by the communicator 23 of the interface module 20 or the communicator 31 of the wireless module 30. These fields are deleted in the reception message processing performed by the communicator 23 of the interface module 20 or the communicator 31 of the wireless module 30 at the time of receiving a message.

<Message Processing Sequence>

A sequence (message processing sequence) of transmitting and receiving a message described above between the interface module 20 and the wireless module 30 includes sequences shown in the following (1) to (3).

(1) Request/response type sequence
(2) First request type sequence
(3) Second request type sequence The request/response type sequence shown in the above (1) is a sequence in which a response of one of the interface module 20 and the wireless module 30, with respect to a request transmitted from the other one of the interface module 20 and the wireless module 30, is transmitted. On the other hand, the first request type sequence shown in the above (2) is a sequence in which a request is transmitted from the wireless module 30 to the interface module 20, but a response is not transmitted from the interface module 20. On the other hand, the second request type sequence shown in the above (3) is a sequence in which a request is transmitted from the interface module 20 to the wireless module 30, but a response is not transmitted from the wireless module 30.

FIG. 4 is a drawing illustrating an example of messages transmitted and received by the request/response type sequence in the embodiment of the present invention. In the example shown in FIG. 4, the message of which message type ("M/H" in FIG. 3) is "field device control request" is a message for requesting a control of the field device 11. The transmission source of the message is the wireless communicator 33 of the wireless module 30, and the transmission destination of the message is the sensor I/F 21 of the interface module 20. For example, the field device control request includes reading of a flow quantity value measured by the field device 11, operating a degree of opening a valve which is the field device 11, adjusting the field device 11, and so on. The message of which message type is "field device control response" is a message for responding to the "field device control request". The transmission source of the message is the sensor I/F 21 of the interface module 20, and the transmission destination of the message is the wireless communicator 33 of the wireless module 30.

Moreover, the message of which message type is "setting request" is a message for requiring a setup of information (for example, provisioning information) which is to be set to the wireless module 30. The transmission source of the message is the setter 26 of the interface module 20, and the transmission destination of the message is the wireless communicator 33 of the wireless module. The message of which message type is "setting response" is a message for responding to the "setting request". The transmission source of the message is the wireless communicator 33 of the wireless module 30, and the transmission destination of the message is the setter 26 of the interface module 20.

In addition, the message of which message type is "firmware identifier obtaining request" is a message for requesting to obtain an identifier of the firmware used by the interface module 20. The message of which message type is "firmware identifier obtaining response" is a message representing a response to the "firmware identifier obtaining request". According to the message, for example, if the identifier of the firmware, which is attached in accordance with the type of the diagnostic function performed by the diagnoser 24, is checked, the type of the diagnostic function performed by the interface module 20 can be checked. The message of which message type is "storage read/write request" is a message for requesting to read and write data with respect to the storage 28 of the interface module 20. The message of which message types are "storage read/write response" is a message representing a response thereof.

Moreover, the message of which message type is a "sensor I/F firmware updating request" is a message for requesting to update the firmware used by the sensor I/F 21 of the interface module 20. The message of which message type is "sensor I/F firmware updating response" is a message representing a response thereof. By the message, for example, the communication protocol implemented in the sensor I/F 21 can be updated (for example, it can be updated to HART (registered trademark)), or the firmware used by the sensor I/F 21 can be updated to be in conformity with a revision number of the communication protocol. The transmission sources and the transmission destinations of these messages are shown in FIG. 4.

FIG. 5 is a drawing illustrating an example of messages transmitted by the first request type sequence in the embodiment of the present invention. In the example shown in FIG. 5, the message of which message type is "initialization completion notice of wireless module" is a message for notifying completion of initialization performed by the wireless module 30 to the interface module 20. The message of which message type is "stop preparation completion notice of wireless module" is a message for notifying completion of stop preparation performed by the wireless module 30 to the interface module 20. The transmission source of these messages is the communicator 31 of the wireless module 30, and the transmission destination of these messages is the communicator 23 of the interface module 20.

Moreover, the message of which message type is "power on/off notice of field device" is a message for notifying (instructing) power on/off of the field device 11 to the interface module 20. The message of which message type is "supplied power setting notice of field device" is a message for notifying (instructing) a setup of power supply of the field device 11 to the interface module 20. The message of which message type is "reset notice of sensor I/F" is a message for notifying (instructing) a reset of the sensor I/F 21 to the interface module 20. The transmission source of these messages is the wireless communicator 33 of the wireless module 30, and the transmission destination of these messages is the sensor I/F 21 of the interface module 20.

Moreover, the message of which message type is "reset notice of battery remaining quantity information" is a message for notifying a reset of a remaining quantity information of the power source 29 (battery) to the interface module 20. The message of which message type is "notice of battery consumption quantity" is a message for notifying an amount of electric power used in the wireless module 30 to the interface module 20. The transmission source of these messages is the wireless communicator 33 of the wireless module 30, and the transmission destination of these messages is the diagnoser 24 of the interface module 20.

Moreover, the message of which message type is "wireless state display notice", "display common setting changing notice", "process value displaying setting notice", "alert display notice", "process value display notice", "device search state display notice", "test state display notice", or "write prohibition state display notice" is a notice (instruction) representing that the wireless module 30 makes the display 25 of the interface module 20 display various types of information, such as measurement data (process value) of the field device 11, a wireless state, an alert, and so on. The transmission source of these messages is the wireless communicator 33 of the wireless module 30, and the transmission destination of these messages is the display 25 of the interface module 20.

Moreover, the message of which message type is "wireless module state notice" is a message for notifying a state of the wireless module 30 to the interface module 20. The transmission source of the message is the diagnoser 34 of the wireless module 30, and the transmission destination of the message is the diagnoser 24 of the interface module 20.

FIG. 6 is a drawing illustrating an example of messages transmitted by the second request type sequence in the embodiment of the present invention. In the example shown in FIG. 6, the message of which message type is "diagnosis information notice" is a message for notifying diagnosis information, which is a result of a diagnosis of the interface module 20, to the wireless module 30. The message of which message type is "battery remaining quantity notice" is a message for notifying a battery remaining quantity of the power source 29 to the wireless module 30. The transmission source of these messages is the diagnoser 24 of the interface module 20, and the transmission destination of these messages is the wireless communicator 33 of the wireless module 30.

Moreover, the message of which message type is "factory shipment state notice", "dip switch state changing notice", or "all display state notice" is a message for notifying various states of each part of the interface module 20, which can be displayed on the display 25, to the wireless module 30. The transmission source of these messages is the display 25 of the interface module 20, and the transmission destination of these messages is the wireless communicator 33 of the wireless module 30.

<Operation of Wireless Device>

Next, an operation of the wireless device 12 will be described. As described above, the message processing sequences between the interface module 20 and the wireless module 30, which are disposed in the wireless device 12, include (1) request/response type sequence, (2) first request type sequence, and (3) second request type sequence. For this reason, operations in a case that these message processing sequences are performed will be described below in order.

<<Operation in a Case that Request/Response Type Sequence is Performed>>

Figure 7:
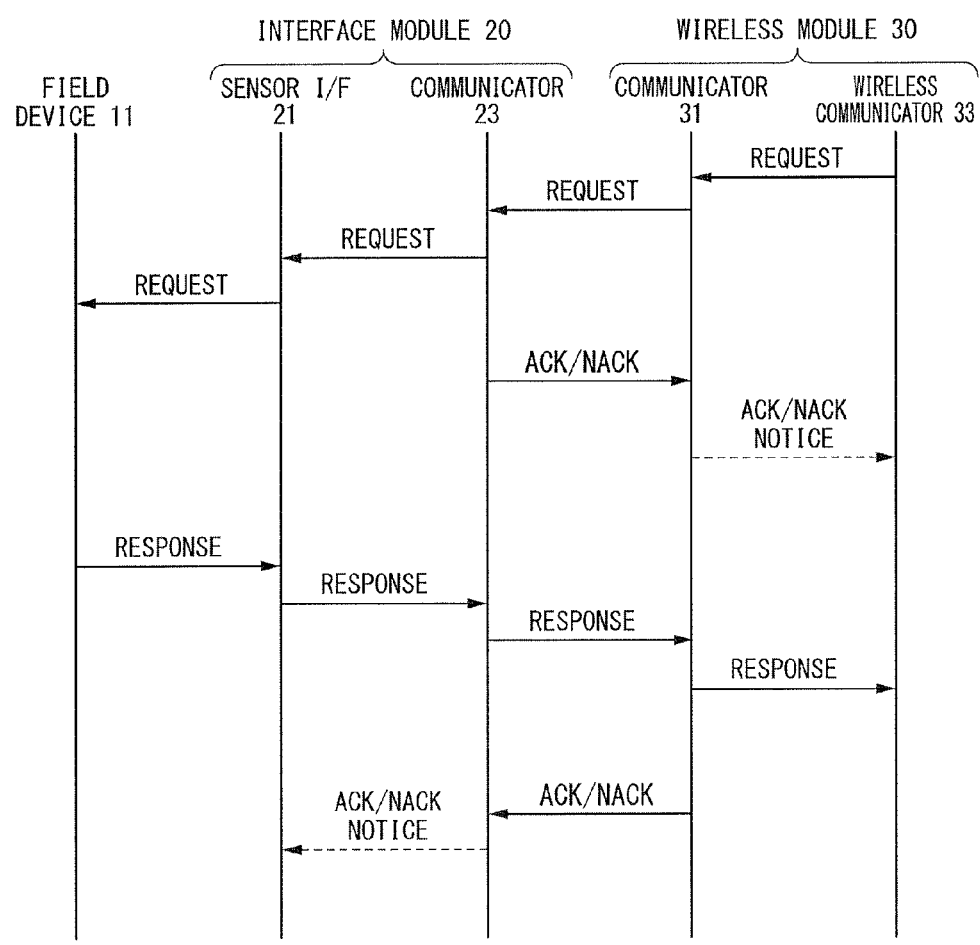
FIG. 7 is a timing chart illustrating an example of operation of the wireless device 12 in a case that the request/response type sequence is performed in the embodiment of the present invention.

FIG. 7 is a timing chart illustrating an example of operation of the wireless device 12 in a case that the request/response type sequence is performed in the embodiment of the present invention. The timing chart shown in FIG. 7 shows an operation in a case that the wireless device 12 obtains measurement data of the field device 11. This operation is started when the wireless communicator 33 of the wireless module 30 receives a control signal (control signal for instructing to obtain measurement data) transmitted from the monitoring control device 16 through the wireless network N1.

When the operation is started, first, the control signal received by the wireless communicator 33 of the wireless module 30 is output to the controller 32. Then, the controller 32 generates data which includes the third field to the sixth field from the head of the data message M0 shown in FIG. 3. Specifically, the data in which the following information was stored in the third field to the sixth field from the head of the data message M0 is generated.

The third "S/D": information of which transmission source is the wireless communicator 33 and of which transmission destination is the sensor I/F 21

The fourth "M/H": message type which is "field device control request"

The fifth "D/S": information which represents the size of the data stored in the sixth field The sixth "DATA": control signal from the monitoring control device 16

When the above data is generated by the controller 32, the generated data is output from the controller 32 to the communicator 31. When the data is output from the controller 32 to the communicator 31, as shown in FIG. 7, a request (field device control request) of which transmission source is the wireless communicator 33 is transmitted to the communicator 31. If the data from the controller 32 is input, the communicator 31 performs the above-described transmission message processing.

Figure 8:
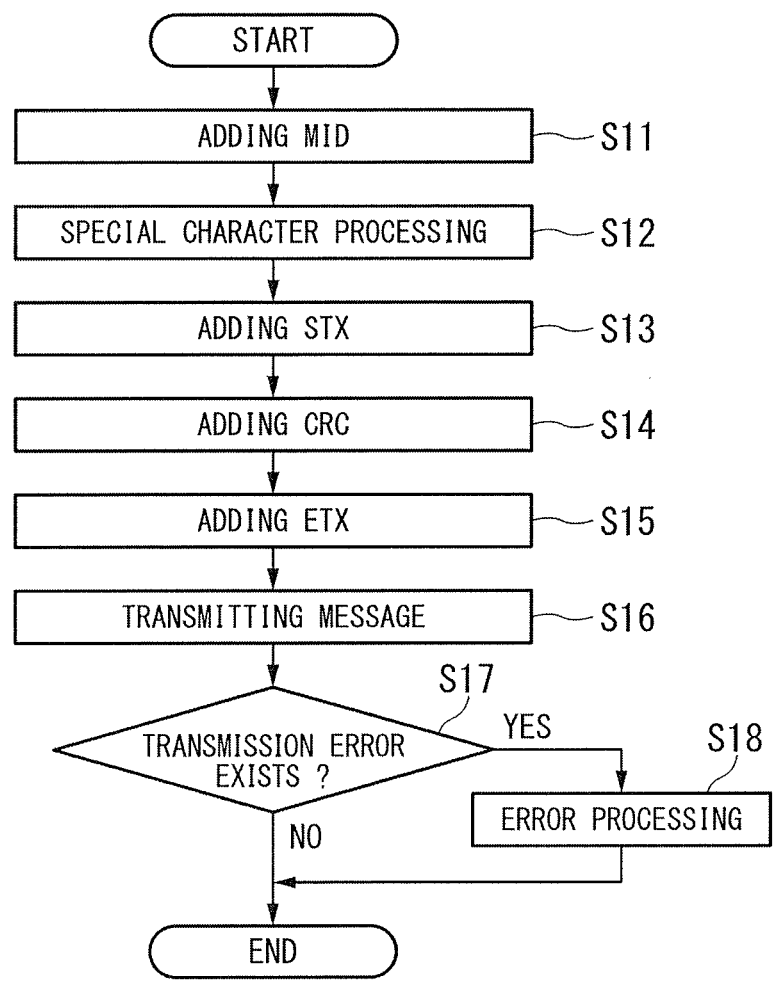
FIG. 8 is a flow chart illustrating the transmission message processing performed by the wireless device by the embodiment of the present invention.

FIG. 8 is a flow chart illustrating the transmission message processing performed by the wireless device by the embodiment of the present invention. For example, the program for performing the flow chart may be stored in the storage 36, or may be stored in another storage medium. For example, the flow chart shown in FIG. 8 is performed every time data is output from the controller 32 to the communicator 31. The communicator 31 performs processing shown in the flow chart shown in FIG. 8. When the transmission message processing is started, first, the communicator 31 adds the "MID" (message ID: refer to FIG. 3) to the head of the data from the controller 32 (Step S11). Next, the communicator 31 performs a special character processing (Step S12). If a special character used as "STX" or "ETX", which is information representing start or end of the message, is included in the data from the controller 32, the special character is replaced to another character in the special character processing.

Next, the communicator 31 adds "STX" to the head of the data (Step S13). Subsequently, the communicator 31 calculates CRC information by using the data before the above "STX" is added, and adds "CRC" to the end of the data to which the processing of Step S13 was performed (data in which "STX" was added to the head) (Step S14). Subsequently, the communicator 31 adds "ETX" to the end of the data to which the processing of Step S14 was performed (data in which "CRC" was added to the end) (Step S15). By the above-described processing, a message in which the message type "field device control request" has been stored in the fourth field "M/H" and the control signal from the monitoring control device 16 has been stored in the sixth field "DATA" (message of the same format as the data message M0 shown in FIG. 3) is generated.

After the above-described processing is completed, the communicator 31 transmits the generated message to the communicator 23 of the interface module 20 (Step S16). Thereby, as shown in FIG. 7, a request of which transmission source is the wireless communicator 33 is transmitted from the communicator 31 to the communicator 23 (transmitting step). If the message is transmitted, the communicator 31 determines whether a transmission error exists or not (Step S17). Specifically, the communicator 31 determines whether an error, such as an error in a physical layer and an error of retransmission, exists or not.

If it is determined that a transmission error does not exist (if the determination result is "NO"), the communicator 31 ends the series of the transmission message processing shown in FIG. 8. On the other hand, if it is determined that a transmission error exists (if the determination result is "YES"), the communicator 31 performs error processing (Step S18). Specifically, the communicator 31 interrupts the transmission processing and returns to an initial state (state before the processing of Step S11 is performed).

In addition, if the message from the communicator 31 is received by the communicator 23, as shown in FIG. 7, in a case of normal reception, an ACK message M11 (refer to FIG. 3) is transmitted from the communicator 23 to the communicator 31. On the other hand, in a case of abnormal reception, a NACK message M12 (refer to FIG. 3) is transmitted from the communicator 23 to the communicator 31. If the ACK message M11 or the NACK message M12 is received by the communicator 31, the wireless communicator 33 is notified thereof.

Figure 9:
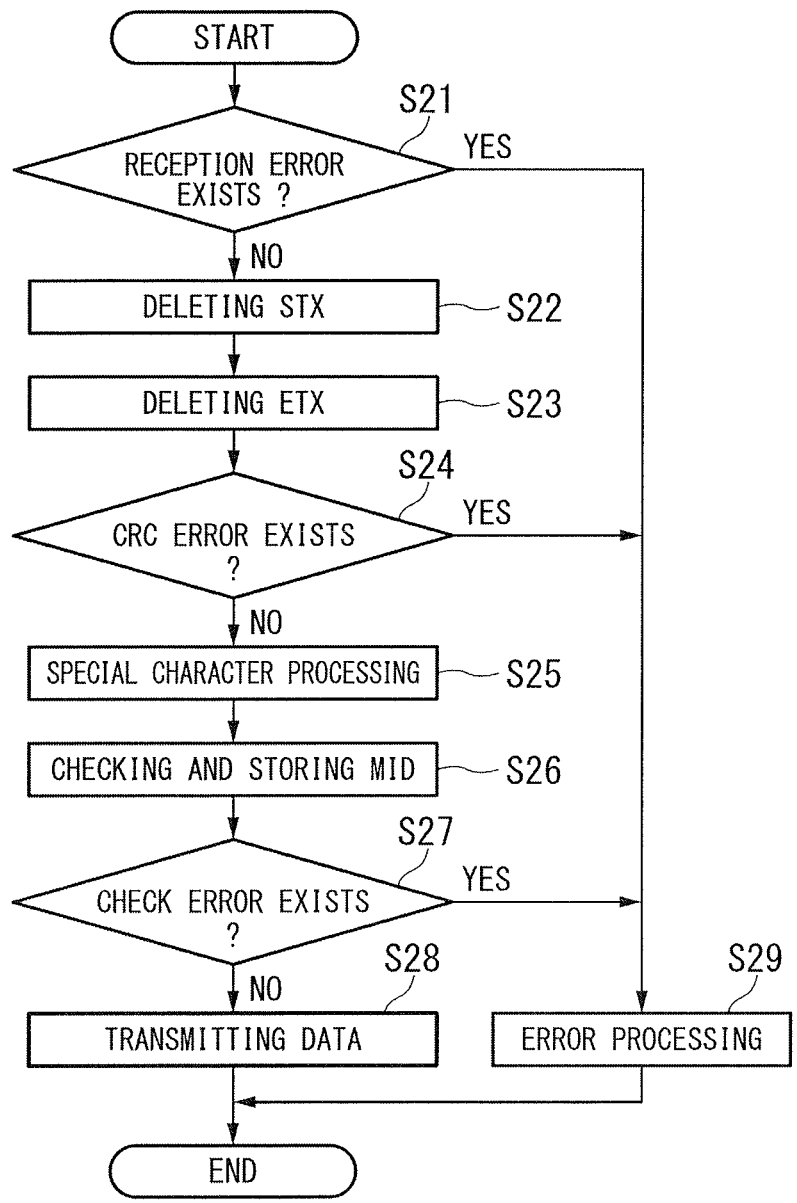
FIG. 9 is a flow chart illustrating the reception message processing performed by the wireless device in the embodiment of the present invention.

If the message from the communicator 31 is received normally, the communicator 23 performs the above-described reception message processing. FIG. 9 is a flow chart illustrating the reception message processing performed by the wireless device in the embodiment of the present invention. For example, the program for performing this flow chart may be stored in the storage 28, or may be stored in another storage medium. For example, the flow chart shown in FIG. 9 is performed every time a message from the communicator 31 is received.

When the reception message processing is started, first, the communicator 23 determines whether a reception error exists or not (Step S21). Specifically, the communicator 23 determines whether an error, such as an error in a physical layer (for example, a framing error), timeout between characters, and frame reception timeout, exists or not. If it is determined that a reception error does not exist (if the determination result is "NO"), the communicator 23 deletes "STX" added to the head of the received message (Step S22). Subsequently, the communicator 23 deletes "ETX" added to the end of the received message (Step S23).

Next, the communicator 23 determines whether a CRC error exists or not (Step S24). Specifically, the communicator 23 calculates CRC information by using the data stored in the second field to the sixth field from the head of the received message (refer to data message M0 shown in FIG. 3). The communicator 23 compares the calculated CRC information and the CRC information stored in the seventh field of the received message.

If it is determined that the CRC error does not exist (if the determination result of Step S24 is "NO"), the communicator 23 performs a special character processing (Step S25). Here, the special character processing is processing for restoring, to the original special character, the character replaced by the special character processing in the transmission message processing described by using FIG. 8. Subsequently, the communicator 23 stores the "MID" (message ID) added to the received message (Step S26).

In addition, in the processing of Step S26, processing in a case of receiving a request is different from processing in a case of receiving a response. Here, since it is a case that the request from the wireless module 30 is received, the communicator 23 stores the message ID as described above. On the other hand, if the communicator 23 receives a response, the communicator 23 checks the message ID added to the message of the response and the message ID previously stored when transmitting the request. If the communicator 23 receives the request, the communicator 23 omits the processing of Step S27 (determination processing of check error). On the other hand, if the communicator 23 receives the response, the communicator 23 performs the processing of Step S27.

When the above-described processing ends, processing of transmitting the data obtained by the processing (data which includes the third field to the sixth field from the head of the data message M0 in FIG. 3) is performed (Step S28). If it is determined that a reception error exists at Step S21, if it is determined that a CRC error exists at Step S24, or if it is determined that a check error exists at Step S27 (if at least one of the determination result of Steps S21, S24, and S27 is "YES"), the communicator 23 performs an error processing (Step S29). Specifically, the communicator 23 interrupts the processing and returns to an initial state (state before the processing of Step S21 is performed).

Figure 10:
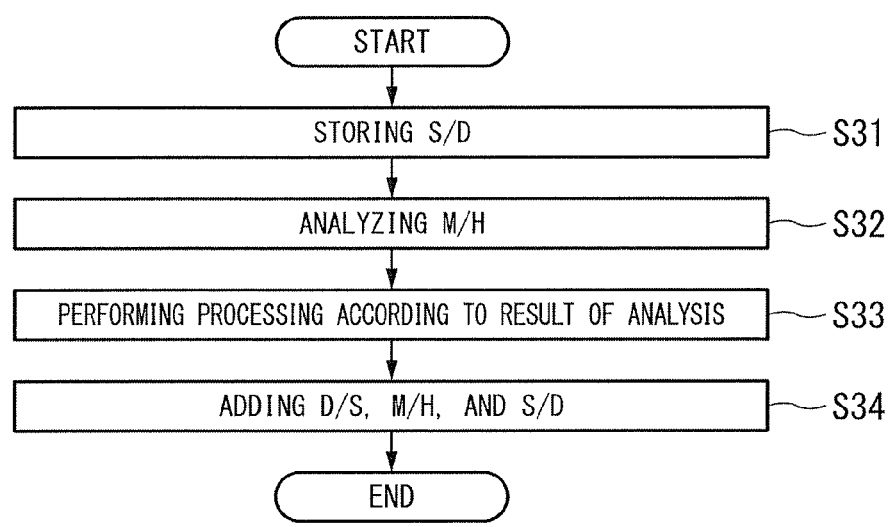
FIG. 10 is a flow chart illustrating details of the data transfer processing performed at Step S28 shown in FIG. 9.

FIG. 10 is a flow chart illustrating details of the data transfer processing performed at Step S28 shown in FIG. 9. For example, the program for performing this flow chart may be stored in the storage 28, or may be stored in another storage medium. The flow chart shown in FIG. 10 is performed every time the data processed by the communicator 23 is input into the controller 22. When the data transfer processing is started, first, the controller 22 stores the "S/D" which is included in the data from the communicator 23 (Step S31). This processing is performed in preparation for a response to a request from the wireless module 30.

Next, the controller 22 analyzes the "M/H" included in the data from the communicator 23, and determines a type of the data included in the message from the wireless module 30 (Step S32). Subsequently, the controller 22 performs processing according to the result of the analysis of Step S32 (Step S33). Here, since the message type "field device control request" is stored in the message from the wireless module 30, the controller 22 transmits the data from the communicator 23 to the sensor I/F 21 (refer to FIG. 4). Thereby, as shown in FIG. 7, the request (field device control request) of which transmission source is the wireless communicator 33 is transmitted to the sensor I/F 21.

As shown in FIG. 7, the request transmitted to the sensor I/F 21 is transmitted to the field device 11. As a response to the request, measurement data is transmitted from the field device 11 to the sensor I/F 21. The measurement data (response) received by the sensor I/F 21 is input into the controller 22.

Then, the controller 22 generates data which includes the third field to the sixth field from the head of the data message M0 in FIG. 3 (Step S34). Specifically, the controller 22 generates the data in which the following information is stored in the third field to the sixth field from the head of the data message M0. The information stored in the third field shown below is information in which the transmission source and the transmission destination of the "S/D", which is stored at the processing of Step S31 in FIG. 10 in preparation for the response to the request from the wireless module 30, are exchanged.

The third "S/D": information of which transmission source is the sensor I/F 21 and of which transmission destination is the wireless communicator 33

The fourth "M/H": message type which is "field device control response"

The fifth "D/S": information which represents the size of the data stored in the sixth field The sixth "DATA": measurement data from the field device 11

When the above data is generated, the controller 22 outputs the generated data to the communicator 23. When the data is output from the controller 22 to the communicator 23, as shown in FIG. 7, a response (field device control response) of which transmission source is the sensor I/F 21 is transmitted to the communicator 23. If the data from the controller 22 is input, the communicator 23 performs the same processing as the transmission message processing described by using FIG. 8, and the message which is to be replied to the wireless module 30 is generated. Thereby, the message of the same format as the message, which was transmitted from the wireless module 30 and received by the communicator 23, is generated.

After the above-described processing is completed, the communicator 23 transmits the generated message to the communicator 31 of the wireless module 30 (Reply Step). Thereby, as shown in FIG. 7, a response of which transmission source is the sensor I/F 21 is transmitted from the communicator 23 to the communicator 31. If the communicator 31 receives the message from the communicator 23, the communicator 31 performs the same processing as the reception message processing described by using FIG. 9. The message processing performed here is reception message processing with respect to the response. For this reason, the communicator 31 performs check processing (Step S26), and determines whether a check error exists or not (Step S27).

In addition, if the message from the communicator 23 is received by the communicator 31, as shown in FIG. 7, in a case of normal reception, an ACK message M11 (refer to FIG. 3) is transmitted from the communicator 31 to the communicator 23. On the other hand, in a case of abnormal reception, a NACK message M12 (refer to FIG. 3) is transmitted from the communicator 31 to the communicator 23. If the ACK message M11 or the NACK message M12 is received by the communicator 23, the sensor I/F 21 is notified thereof.

The data obtained by the reception message processing is output from the communicator 31 to the controller 32. Here, since the message type "field device control response" is stored in the data input from the communicator 31 into the controller 32, the controller 32 transmits the data from the communicator 31 to the wireless communicator 33 (refer to FIG. 4). Thereby, as shown in FIG. 7, the response received by the communicator 31 is transmitted to the wireless communicator 33.

The data (data includes measurement data of the field device 11) transmitted to the wireless communicator 33 is transmitted toward the monitoring control device 16 through the wireless network N1. Thus, the measurement data of the field device 11 is collected by the monitoring control device 16 based on the control signal from the monitoring control device 16.

In addition, in the example described above, the wireless module 30 transmits a request to the interface module 20, and the interface module 20 transmits a response to the wireless module 30. Contrary to this example, in a case that the interface module 20 transmits a request to the wireless module 30, and the wireless module 30 transmits a response to the interface module 20, the same operation as the operation described above is performed.

Moreover, in the example described above, a message including a control request with respect to the field device 11 or a control response from the field device 11 as a message type is transmitted and received between the wireless module 30 and the interface module 20. In a case that a message including a processing request with respect to the interface module 20 and a processing response from the interface module 20 as a message type is transmitted and received, or a message including a processing request with respect to the wireless module 30 and a processing response from the wireless module 30 as a message type is transmitted and received, the same operation as the operation described above is performed.

Here, in a case that a message type included in the received message is a processing request, the interface module 20 and the wireless module 30 set a message type included in a message, which is to be replied, to a processing response. Moreover, in a case that a message type included in the received message is a processing request with respect to the self-module, the interface module 20 and the wireless module 30 store, in the message which is to be replied, a processing result of the processing performed according to the processing request.

<<Operation in a Case that First Request Type Sequence is Performed>>

Figure 11:
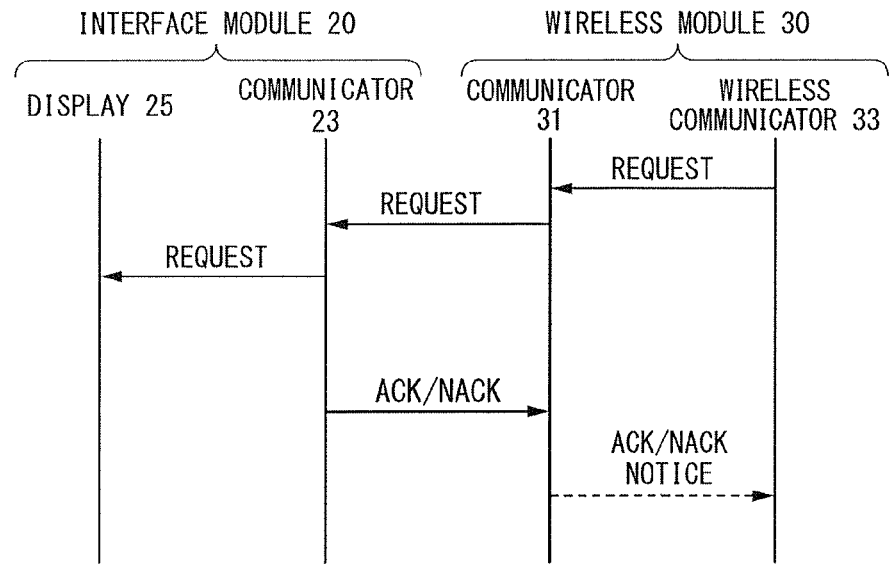
FIG. 11 is a timing chart illustrating an example of operation of the wireless device 12 in a case that the first request type sequence is performed in the embodiment of the present invention.

FIG. 11 is a timing chart illustrating an example of operation of the wireless device 12 in a case that the first request type sequence is performed in the embodiment of the present invention. For example, the timing chart shown in FIG. 11 shows an operation in a case that the wireless module 30 performs a display notice (here, "wireless state display notice") to the interface module 20.

When an operation is started, first, information representing a wireless state, which is to be notified, is output from the wireless communicator 33 to the controller 32. Then, the controller 32 generates data which includes the third field to the sixth field from the head of the data message M0 in FIG. 3. Specifically, the data in which the following information is stored in the third field to the sixth field from the head of the data message M0 is generated.

The third "S/D": information of which transmission source is the wireless communicator 33 and of which transmission destination is the display 25

The fourth "M/H": message type which is "wireless state display notice"

The fifth "D/S": information which represents the size of the data stored in the sixth field The sixth "DATA": information which represents a wireless state When the above data is generated by the controller 32, the generated data is output from the controller 32 to the communicator 31. Thereby, as shown in FIG. 11, a request (wireless state display notice), of which transmission source is the wireless communicator 33, is transmitted to the communicator 31. If the data from the controller 32 is input, the communicator 31 performs the same processing as the transmission message processing described by using FIG. 8, and the message which is to be transmitted to the interface module 20 is generated.

After the above-described processing is completed, processing of transmitting the generated message to the communicator 23 of the interface module 20 is performed. Thereby, as shown in FIG. 11, a request of which transmission source is the wireless communicator 33 is transmitted from the communicator 31 to the communicator 23. When the message from the communicator 31 is received, the communicator 23 performs the same processing as the reception message processing described by using FIG. 9.

In addition, if the message from the communicator 31 is received by the communicator 23, as shown in FIG. 11, in a case of normal reception, an ACK message M11 (refer to FIG. 3) is transmitted from the communicator 23 to the communicator 31, and in a case of abnormal reception, a NACK message M12 (refer to FIG. 3) is transmitted from the communicator 23 to the communicator 31. If the ACK message M11 or the NACK message M12 is received by the communicator 31, the wireless communicator 33 is notified thereof.

The data obtained by the reception message processing is output from the communicator 23 to the controller 22. Here, since the message type "wireless state display notice" is stored in the data input from the communicator 23 into the controller 22, the controller 22 transmits the data from the communicator 23 to the display 25 (refer to FIG. 5). Thereby, as shown in FIG. 11, the request received by the communicator 23 is transmitted to the display 25. Thus, the information which represents a wireless state of the wireless module 30 is displayed on the display 25 of the interface module 20. As shown in FIG. 11, in the first request type sequence, the interface module 20 which received the request from the wireless module 30 does not reply a response to the wireless module 30.

<<Operation in a Case that Second Request Type Sequence is Performed>>

Figure 12:
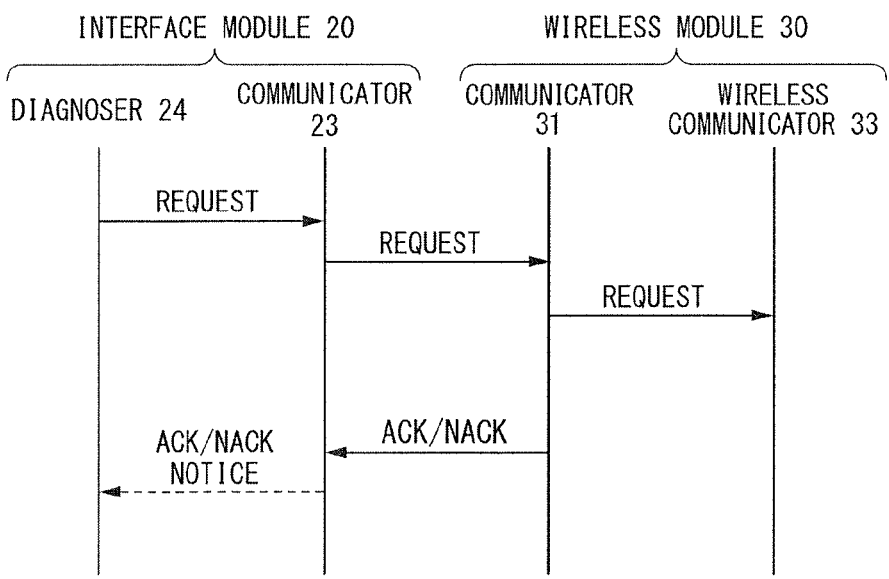
FIG. 12 is a timing chart illustrating an example of operation of the wireless device 12 in a case that the second request type sequence is performed in the embodiment of the present invention.

FIG. 12 is a timing chart illustrating an example of operation of the wireless device 12 in a case that the second request type sequence is performed in the embodiment of the present invention. For example, the timing chart shown in FIG. 12 shows an operation in a case that the interface module 20 performs a battery remaining quantity notice to the wireless module 30.

When an operation is started, first, information representing battery power, which is to be notified, is output from the diagnoser 24 to the controller 22. Then, the controller 22 generates data which includes the third field to the sixth field from the head of the data message M0 in FIG. 3. Specifically, the data in which the following information is stored in the third field to the sixth field from the head of the data message M0 is generated.

The third "S/D": information of which transmission source is the diagnoser 24 and of which transmission destination is the wireless communicator 33

The fourth "M/H": message type which is "battery remaining quantity notice"

The fifth "D/S": information which represents the size of the data stored in the sixth field The sixth "DATA": information which represents battery remaining quantity When the above data is generated by the controller 22, the controller 22 outputs the generated data to the communicator 23. Thereby, as shown in FIG. 12, the request (battery remaining quantity notice), of which transmission source is the diagnoser 24, is transmitted to the communicator 23. If the data from the controller 22 is input, the communicator 23 performs the same processing as the transmission message processing described by using FIG. 8, and the message which is to be transmitted to wireless module 30 is generated.

After the above-described processing is completed, processing of transmitting the generated message to the communicator 31 of the wireless module 30 is performed. Thereby, as shown in FIG. 12, a request of which transmission source is the diagnoser 24 is transmitted from the communicator 23 to the communicator 31. When the message from the communicator 23 is received, the communicator 31 performs the same processing as the reception message processing described by using FIG. 9.

In addition, if the message from the communicator 23 is received by the communicator 31, as shown in FIG. 12, in a case of normal reception, an ACK message M11 (refer to FIG. 3) is transmitted from the communicator 31 to the communicator 23. On the other hand, in a case of abnormal reception, a NACK message M12 (refer to FIG. 3) is transmitted from the communicator 31 to the communicator 23. If the ACK message M11 or the NACK message M12 is received by the communicator 23, the diagnoser 24 is notified thereof.

The data obtained by reception message processing is output from the communicator 31 to the controller 32. Here, since the message type "battery remaining quantity notice" is stored in the data input from the communicator 31 into the controller 32, the controller 32 transmits the data from the communicator 31 to the wireless communicator 33 (refer to FIG. 6). Thereby, as shown in FIG. 12, the request received by the communicator 31 is transmitted to the wireless communicator 33. Thus, the information which represents the remaining quantity of the power source 29 (battery) of the interface module 20 is transmitted to the wireless module 30. As shown in FIG. 12, in the second request type sequence, the wireless module 30 which received the request from the interface module 20 does not reply a response to the interface module 20.

As described above, in the present embodiment, the wireless module 30 generates a message of a predetermined format including data which is to be transmitted to the interface module 20 and a message type, and the wireless module 30 transmits it to the interface module 20. The interface module 20 generates a message in accordance with the message type included in the received message, and replies it to the wireless module 30. The generated message includes data which is to be replied to the wireless module 30 and the message type, and the generated message is the same in a format as the received message.

On the contrary, the interface module 20 generates a message of a predetermined format including data which is to be transmitted to the wireless module 30 and a message type, and the interface module 20 transmits it to the wireless module 30. The wireless module 30 generates a message in accordance with the message type included in the received message, and replies it to the interface module 20. The generated message includes data which is to be replied to the interface module 20 and the message type, and the generated message is the same in a format as the received message. In addition, in the present embodiment, notifications and instructions from the wireless module 30 to the interface module 20, and notifications and instructions from the interface module 20 to the wireless module 30 are performed by using the same message in a format as the above-described message.

Thus, in the present embodiment, the message of the format unified between the interface module 20 and the wireless module 30 is transmitted and received. For this reason, design and development of the interface module 20 and the wireless module 30 can be performed easily. Thereby, even if the interface module 20 and the wireless module 30 are developed and manufactured by manufacturers which differ from each other, the field device 11 can be operated as a wireless field device which performs stable wireless communications.

Figure 13:
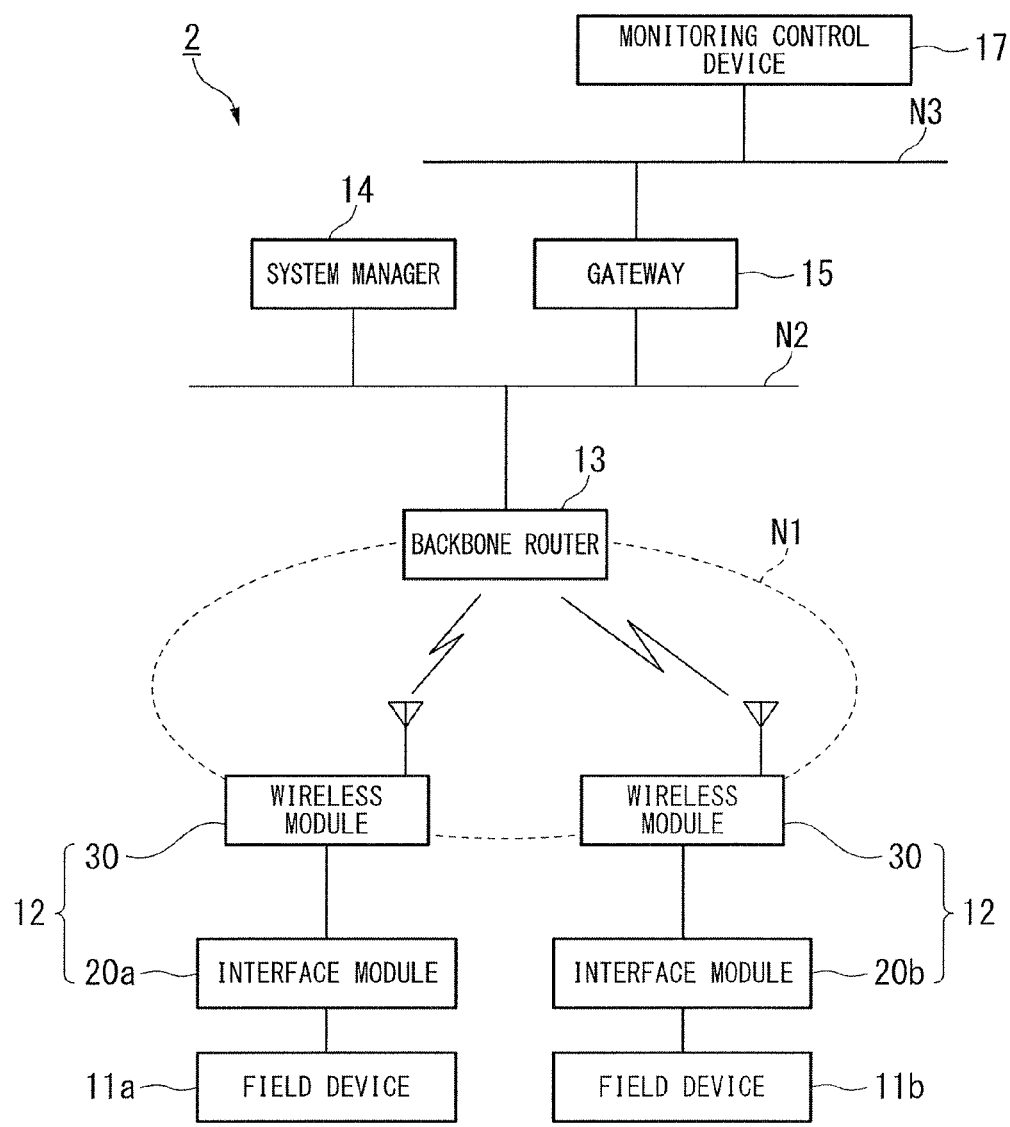
FIG. 13 is a drawing illustrating an application example of a wireless communication system in which the wireless device in the embodiment of the present invention is used.

FIG. 13 is a drawing illustrating an application example of a wireless communication system in which the wireless device in the embodiment of the present invention is used. In FIG. 13, parts that correspond to those in FIG. 1 are assigned the same reference numerals. The wireless communication system 2 shown in FIG. 13 is a communication system which can make field devices 11a and 11b, in which different communication protocols are implemented, join in the wireless network N1.

Although the field devices 11a and 11b are the same as the field device 11 shown in FIG. 1, different communication protocols are implemented in the field device 11a and 11b. For example, a communication protocol in conformity with HART (registered trademark) is implemented in the field device 11a. On the other hand, a communication protocol in conformity with MODBUS (registered trademark) is implemented in the field device 11b.

The interface modules 20a and 20b are the same as the interface module 20 shown in FIG. 1. A communication protocol which can communicate with the field device 11a is implemented in the interface module 20a. Moreover, a communication protocol which can communicate with the field device 11b is implemented in the interface module 20b. For example, a communication protocol in conformity with HART (registered trademark) is implemented in the interface module 20a, and a communication protocol in conformity with MODBUS (registered trademark) is implemented in the interface module 20b.

Although the monitoring control device 17 is the same as the monitoring control device 16 shown in FIG. 1, the monitoring control device 17 can communicate with both the field devices 11a and 11b. That is, the monitoring control device 17 can transmit a control signal specified by HART (registered trademark) and a control signal specified by MODBUS (registered trademark).

In the wireless communication system 2, the wireless device 12 is connected to the field devices 11a and 11b so that the various field devices 11a and 11b can join in the wireless network N1. Moreover, the field devices 11a and 11b can be controlled without considering a route to the field devices 11a and 11b.

As described above, although a wireless device, a wireless communication system, a wireless module, an interface module, and a communication method according to embodiments of the present invention have been described above, the present invention is not restricted to the above-described embodiments, and can be freely modified within the scope thereof. For example, although the foregoing descriptions of the embodiments have been examples in which the wireless device performs wireless communications in conformity with ISA100.11a, the present invention can be also applied to a wireless device which perform wireless communications in conformity with WirelessHART (registered trademark).

REFERENCE SIGNS LIST

11 Field device
11a Field device
11b Field device
12 Wireless device
20 Interface Module
20a Interface module
20b Interface module
22 Controller
23 Communicator
30 Wireless module
31 Communicator
32 Controller

The invention claimed is:

1. A wireless device comprising:
a wireless module configured to wirelessly transmit a signal which has been received from a field device, and wirelessly receive a signal which is to be transmitted to the field device; and
an interface module which is disposed between the wireless module and the field device,
wherein one of the wireless module and the interface module generates a first message having a predetermined format, the first message includes data and type information, the data is to be transmitted to other one of the wireless module and the interface module, the type information represents a type of the data, and the one of the wireless module and the interface module transmits the first message to the other one of the wireless module and the interface module,
wherein the other one of the wireless module and the interface module generates a second message having the same format as the first message in accordance with the type information included in the first message, the second message includes data and type information, the data is to be replied to the one of the wireless module and the interface module, the type information represents a type of the data, and the other one of the wireless module and the interface module replies the second message to the one of the wireless module and the interface module, and
wherein in a case that the type information included in the first message represents notifications or instructions, the other one of the wireless module and the interface module performs processing in accordance with the notifications or the instructions, and does not reply to the one of the wireless module and the interface module.

2. The wireless device according to claim 1,
wherein in a case that the type information included in the first message is a processing request, the other one of the wireless module and the interface module stores the type information in the second message as a processing response.

3. The wireless device according to claim 1,
wherein the interface module comprises a display,
wherein a processing request, as the type information included in the first message which is transmitted from the wireless module to the interface module, includes a wireless state display notice for displaying information representing a wireless state of the wireless module on the display, and
wherein even if the interface module receives the first message about the wireless state display notice, the interface module does not reply the second message to the wireless module.

4. The wireless device according to claim 1,
wherein the interface module comprises a power source,
wherein a processing request, as the type information included in the first message which is transmitted from the interface module to the wireless module, includes a battery remaining quantity notice for notifying a battery remaining quantity, and
wherein even if the wireless module receives the first message about the battery remaining quantity notice, the wireless module does not reply the second message to the interface module.

5. The wireless device according to claim 1,
wherein the wireless module comprises:
a wireless communicator configured to wirelessly communicate;
a first communicator configured to communicate with the interface module; and
a first controller configured to control the wireless communicator and the first communicator.

6. A wireless device comprising:
a wireless module configured to wirelessly transmit a signal which has been received from a field device, and wirelessly receive a signal which is to be transmitted to the field device; and
an interface module which is disposed between the wireless module and the field device,
wherein one of the wireless module and the interface module generates a first message having a predetermined format, the first message includes data and type information, the data is to be transmitted to other one of the wireless module and the interface module, the type information represents a type of the data, and the one of the wireless module and the interface module transmits the first message to the other one of the wireless module and the interface module,
wherein the other one of the wireless module and the interface module generates a second message having the same format as the first message in accordance with the type information included in the first message, the second message includes data and type information, the data is to be replied to the one of the wireless module and the interface module, the type information represents a type of the data, and the other one of the wireless module and the interface module replies the second message to the one of the wireless module and the interface module, and
wherein in a case that the type information included in the first message is a processing request to a self-module, the other one of the wireless module and the interface module stores, in the second message, a processing result of processing performed according to the processing request to a self-module as data which is to be replied.

7. A wireless device comprising:
a wireless module configured to wirelessly transmit a signal which has been received from a field device, and wirelessly receive a signal which is to be transmitted to the field device; and
an interface module which is disposed between the wireless module and the field device,
wherein one of the wireless module and the interface module generates a first message having a predetermined format, the first message includes data and type information, the data is to be transmitted to other one of the wireless module and the interface module, the type information represents a type of the data, and the one of the wireless module and the interface module transmits the first message to the other one of the wireless module and the interface module,
wherein the other one of the wireless module and the interface module generates a second message having the same format as the first message in accordance with the type information included in the first message, the second message includes data and type information, the data is to be replied to the one of the wireless module and the interface module, the type information represents a type of the data, and the other one of the wireless module and the interface module replies the second message to the one of the wireless module and the interface module,
wherein a processing request, as the type information included in the first message which is transmitted from the wireless module to the interface module, includes a control request to the field device, and
wherein a processing response, as the type information included in the second message which is replied from the interface module to the wireless module, includes a control response from the field device.

8. A wireless device comprising:
a wireless module configured to wirelessly transmit a signal which has been received from a field device, and wirelessly receive a signal which is to be transmitted to the field device; and
an interface module which is disposed between the wireless module and the field device,
wherein one of the wireless module and the interface module generates a first message having a predetermined format, the first message includes data and type information, the data is to be transmitted to other one of the wireless module and the interface module, the type information represents a type of the data, and the one of the wireless module and the interface module transmits the first message to the other one of the wireless module and the interface module,
wherein the other one of the wireless module and the interface module generates a second message having the same format as the first message in accordance with the type information included in the first message, the second message includes data and type information, the data is to be replied to the one of the wireless module and the interface module, the type information represents a type of the data, and the other one of the wireless module and the interface module replies the second message to the one of the wireless module and the interface module,
wherein the wireless module comprises:
a wireless communicator configured to wirelessly communicate;
a first communicator configured to communicate with the interface module; and
a first controller configured to control the wireless communicator and the first communicator, and
wherein the first controller generates data which includes information representing a transmission source and a transmission destination of the first message, the type information, information representing a size of data which is to be transmitted to the interface module, and data which is to be transmitted to the interface module.

9. The wireless device according to claim 8,
wherein the first communicator adds, to the data generated by the first controller, information representing a start of the first message, ID of the first message, information which is used for performing error check of transmission and reception, and information representing an end of the first message, to generate the first message, and
wherein the first communicator transmits the generated first message to the interface module.

10. The wireless device according to claim 9,
wherein the interface module comprises:
a sensor I/F configured to communicate with the field device;
a second communicator configured to communicate with the wireless module; and
a second controller configured to control the sensor I/F and the second communicator.

11. The wireless device according to claim 10,
wherein the second communicator deletes, from the first message received from the wireless module, the information representing the start of the first message and the information representing the end of the first message.

12. The wireless device according to claim 11,
wherein the second communicator determines whether an error exists or not based on the information which is used for performing the error check of transmission and reception, which is included in the first message received from the wireless module.

13. The wireless device according to claim 12,
wherein in a case that the second communicator determines the error does not exist, the second controller analyzes the type information included in the first message, and performs in accordance with a result of the analyze.

14. A wireless communication system comprising:
a first wireless module configured to wirelessly transmit a signal which has been received from a first field device, and wirelessly receive a signal which is to be transmitted to the first field device;
a first interface module which is disposed between the first wireless module and the first field device, a first communication protocol being implemented in the first interface module;
a second wireless module configured to wirelessly transmit a signal which has been received from a second field device, and wireles sly receive a signal which is to be transmitted to the second field device; and
a second interface module which is disposed between the second wireless module and the second field device, a second communication protocol being different from the first communication protocol and implemented in the second interface module;
wherein one of the first wireless module and the first interface module generates a first message having a predetermined format, the first message includes data and type information, the data is to be transmitted to other one of the first wireless module and the first interface module, the type information represents a type of the data, and the one of the first wireless module and the first interface module transmits the first message to the other one of the first wireless module and the first interface module,
wherein the other one of the first wireless module and the first interface module generates a second message having the same format as the first message in accordance with the type information included in the first message, the second message includes data and type information, the data is to be replied to the one of the first wireless module and the first interface module, the type information represents a type of the data, and the other one of the first wireless module and the first interface module replies the second message to the one of the first wireless module and the first interface module,
wherein one of the second wireless module and the second interface module generates a third message having a predetermined format, the third message includes data and type information, the data is to be transmitted to other one of the second wireless module and the second interface module, the type information represents a type of the data, and the one of the second wireless module and the second interface module transmits the third message to the other one of the second wireless module and the second interface module, and
wherein the other one of the second wireless module and the second interface module generates a fourth message having the same format as the third message in accordance with the type information included in the third message, the fourth message includes data and type information, the data is to be replied to the one of the second wireless module and the second interface module, the type information represents a type of the data, and the other one of the second wireless module and the second interface module replies the fourth message to the one of the second wireless module and the second interface module.

15. A wireless module comprising:
a communicator configured to wirelessly receive a first message which has been received from outside, and wirelessly transmit a second message to outside; and
a controller configured to control the communicator to transmit the second message, the second message having a predetermined format, the second message including data and type information, the data is to be transmitted to outside, the type information representing a type of the data,
wherein in a case that the type information included in the first message represents notifications or instructions, the wireless module performs processing in accordance with the notifications or the instructions, and does not reply to the outside.

16. The wireless module according to claim 15,
wherein the controller replies the second message from the communicator to outside in accordance with the type information included in the first message, and
wherein the second message is the same format as the first message, which includes data which is to be replied to outside and type information representing a type of the data.

17. An interface module comprising:
a communicator configured to wirelessly receive a first message from a wireless module, and wirelessly transmit a second message to the wireless module; and
a controller configured to control the communicator to reply the second message from the communicator to the wireless module in accordance with type information included in the first message, the second message having the same format as the first message, the second message including data and type information, the data is to be replied to the wireless module, the type information representing a type of the data,
wherein in a case that the type information included in the first message represents notifications or instructions, the interface module performs processing in accordance with the notifications or the instructions, and does not reply to the wireless module.

18. The interface module according to claim 17,
wherein the controller transmits a third message from the communicator to the wireless module, and
wherein the third message is of a predetermined format which includes data which is to be transmitted to the wireless device and type information representing a type of the data.

19. A communication method between a wireless module which transmits and receives signals wirelessly and an interface module which is disposed between the wireless module and the field device, comprising:
generating, by one of the wireless module and the interface module, first message having a predetermined format, the first message including data and type information, the data being to be transmitted to other one of the wireless module and the interface module, the type information representing a type of the data;
transmitting, by the one of the wireless module and the interface module, the first message to the other one of the wireless module and the interface module;

generating, by the other one of the wireless module and the interface module, a second message having the same format as the first message in accordance with the type information included in the first message, the second message including data and type information, the data being to be replied to the one of the wireless module and the interface module, the type information representing a type of the data; and replying, by the other one of the wireless module and the interface module, the second message to the one of the wireless module and the interface module, wherein in a case that the type information included in the first message represents notifications or instructions, the other one of the wireless module and the interface module performs processing in accordance with the notifications or the instructions, and does not reply to the one of the wireless module and the interface module.

20. A wireless module comprising:

a communicator configured to wirelessly receive a first message which has been received from outside, and wirelessly transmit a second message to outside; and a controller configured to control the communicator to transmit the second message, the second message having a predetermined format, the second message including data and type information, the data is to be transmitted to outside, the type information representing a type of the data, wherein in a case that the type information included in the first message is a processing request to a self-module, the wireless module stores, in the second message, a processing result of processing performed according to the processing request to a self-module as data which is to be replied.

21. A wireless module comprising:

a communicator configured to wirelessly receive a first message which has been received from outside, and wirelessly transmit a second message to outside; and a controller configured to control the communicator to transmit the second message, the second message having a predetermined format, the second message including data and type information, the data is to be transmitted to outside, the type information representing a type of the data, wherein a processing request, as the type information included in the first message which is transmitted from outside to the wireless module, includes a control request to the field device, and wherein a processing response, as the type information included in the second message which is replied from outside to the wireless module, includes a control response from the field device.

22. A wireless module comprising:

a communicator configured to wirelessly receive a first message which has been received from outside, and wirelessly transmit a second message to outside; and a controller configured to control the communicator to transmit the second message, the second message having a predetermined format, the second message including data and type information, the data is to be transmitted to outside, the type information representing a type of the data, wherein the controller generates data which includes information representing a transmission source and a transmission destination of the first message, the type information, information representing a size of data which is to be transmitted to outside, and data which is to be transmitted to outside.

23. An interface module comprising:

a communicator configured to wirelessly receive a first message from a wireless module, and wirelessly transmit a second message to the wireless module; and a controller configured to control the communicator to reply the second message from the communicator to the wireless module in accordance with type information included in the first message, the second message having the same format as the first message, the second message including data and type information, the data is to be replied to the wireless module, the type information representing a type of the data, wherein in a case that the type information included in the first message is a processing request to a self-module, the interface module stores, in the second message, a processing result of processing performed according to the processing request to a self-module as data which is to be replied.

24. An interface module comprising:

a communicator configured to wirelessly receive a first message from a wireless module, and wirelessly transmit a second message to the wireless module; and a controller configured to control the communicator to reply the second message from the communicator to the wireless module in accordance with type information included in the first message, the second message having the same format as the first message, the second message including data and type information, the data is to be replied to the wireless module, the type information representing a type of the data, wherein a processing request, as the type information included in the first message which is transmitted from the wireless module to the interface module, includes a control request to the field device, and wherein a processing response, as the type information included in the second message which is replied from the interface module to the wireless module, includes a control response from the field device.

25. An interface module comprising:

a communicator configured to wirelessly receive a first message from a wireless module, and wirelessly transmit a second message to the wireless module; and a controller configured to control the communicator to reply the second message from the communicator to the wireless module in accordance with type information included in the first message, the second message having the same format as the first message, the second message including data and type information, the data is to be replied to the wireless module, the type information representing a type of the data, wherein the controller generates data which includes information representing a transmission source and a transmission destination of the first message, the type information, information representing a size of data which is to be transmitted to the wireless module, and data which is to be transmitted to the wireless module.

26. A communication method between a wireless module which transmits and receives signals wirelessly and an interface module which is disposed between the wireless module and the field device, comprising:

generating, by one of the wireless module and the interface module, first message having a predetermined format, the first message including data and type information, the data being to be transmitted to other one of the wireless module and the interface module, the type information representing a type of the data;

transmitting, by the one of the wireless module and the interface module, the first message to the other one of the wireless module and the interface module;

generating, by the other one of the wireless module and the interface module, a second message having the same format as the first message in accordance with the type information included in the first message, the second message including data and type information, the data being to be replied to the one of the wireless module and the interface module, the type information representing a type of the data;

replying, by the other one of the wireless module and the interface module, the second message to the one of the wireless module and the interface module; and in a case that the type information included in the first message is a processing request to a self-module, storing, by the other one of the wireless module and the interface module, in the second message, a processing result of processing performed according to the processing request to a self-module as data which is to be replied.

27. A communication method between a wireless module which transmits and receives signals wirelessly and an interface module which is disposed between the wireless module and the field device, comprising:

generating, by one of the wireless module and the interface module, first message having a predetermined format, the first message including data and type information, the data being to be transmitted to other one of the wireless module and the interface module, the type information representing a type of the data;

transmitting, by the one of the wireless module and the interface module, the first message to the other one of the wireless module and the interface module;

generating, by the other one of the wireless module and the interface module, a second message having the same format as the first message in accordance with the type information included in the first message, the second message including data and type information, the data being to be replied to the one of the wireless module and the interface module, the type information representing a type of the data; and replying, by the other one of the wireless module and the interface module, the second message to the one of the wireless module and the interface module, wherein a processing request, as the type information included in the first message which is transmitted from outside to the wireless module, includes a control request to the field device, and wherein a processing response, as the type information included in the second message which is replied from outside to the wireless module, includes a control response from the field device.

28. A communication method between a wireless module which transmits and receives signals wirelessly and an interface module which is disposed between the wireless module and the field device, comprising:

generating, by one of the wireless module and the interface module, first message having a predetermined format, the first message including data and type information, the data being to be transmitted to other one of the wireless module and the interface module, the type information representing a type of the data;

transmitting, by the one of the wireless module and the interface module, the first message to the other one of the wireless module and the interface module;

generating, by the other one of the wireless module and the interface module, a second message having the same format as the first message in accordance with the type information included in the first message, the second message including data and type information, the data being to be replied to the one of the wireless module and the interface module, the type information representing a type of the data;

replying, by the other one of the wireless module and the interface module, the second message to the one of the wireless module and the interface module; and generating data which includes information representing a transmission source and a transmission destination of the first message, the type information, information representing a size of data which is to be transmitted to the interface module, and data which is to be transmitted to the interface module.

* * * * *